US010673910B2

(12) United States Patent
Greene (10) Patent No.: US 10,673,910 B2
(45) Date of Patent: Jun. 2, 2020

(54) NETWORK MARKETING AND ANALYSIS TOOL

(71) Applicant: Level 3 Communications, LLC, Broomfield, CO (US)

(72) Inventor: Mack Denzil Greene, Westminster, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 1657 days.

(21) Appl. No.: 13/896,158

(22) Filed: May 16, 2013

(65) Prior Publication Data

US 2013/0343374 A1 Dec. 26, 2013

Related U.S. Application Data

(60) Provisional application No. 61/647,795, filed on May 16, 2012.

(51) Int. Cl.
*H04L 29/06* (2006.01)
*G06Q 30/02* (2012.01)
*H04L 12/725* (2013.01)

(52) U.S. Cl.
CPC ......... *H04L 65/1083* (2013.01); *G06Q 30/02* (2013.01); *H04L 45/306* (2013.01)

(58) Field of Classification Search
CPC ................................................. H04L 12/2424
See application file for complete search history.

(56) References Cited

U.S. PATENT DOCUMENTS

| 8,290,768 | B1 * | 10/2012 | Nelken ............................ 704/9 |
| 2005/0114704 | A1 * | 5/2005 | Swander ............ H04L 63/0263 726/4 |
| 2006/0072548 | A1 * | 4/2006 | Mundra et al. ............... 370/352 |
| 2006/0088030 | A1 * | 4/2006 | Beeson et al. ................ 370/389 |
| 2007/0047707 | A1 * | 3/2007 | Mayer et al. ............ 379/114.28 |
| 2008/0243725 | A1 * | 10/2008 | Homan-Muise ....... G06Q 30/02 705/400 |
| 2009/0086630 | A1 * | 4/2009 | Hamada ....................... 370/230 |

(Continued)

OTHER PUBLICATIONS

Jonathan Jedwab, Peter Phaal, Bob Pinna, "Traffic estimation for the largest sources on a network, using packet sampling with limited storage", Mar. 1992, Hewlett Packard, pp. 1-13.*

*Primary Examiner* — Noel R Beharry
*Assistant Examiner* — Rodrick Mak (57) ABSTRACT

Implementations described and claimed herein provide systems and methods for differentiating a portion of network traffic having an Internet Protocol-based attribute with reasonable certainty. In one implementation, data corresponding to a delivery of network traffic across a communications network is received. A first filter is applied to obtain a first subset of the data based on one or more characteristics of originating access traffic. The first subset includes network traffic known to originate with the Internet Protocol-based attribute. A second filter is applied to data excluded from the first subset based on one or more characteristics of terminating access traffic to obtain a second subset of the data. The second subset includes network traffic known to terminate with the Internet Protocol-based attribute. The first subset is correlated with the second subset to identify the portion of network traffic having the Internet Protocol-based attribute.

6 Claims, 5 Drawing Sheets

(56) References Cited

U.S. PATENT DOCUMENTS

2009/0268715 A1* 10/2009 Jansson ................ H04M 15/00
                                                        370/352
2010/0103837 A1* 4/2010 Jungck et al. ................ 370/252
2011/0208959 A1* 8/2011 Kant et al. .................... 713/151
2013/0139246 A1* 5/2013 Tryc et al. ...................... 726/13

* cited by examiner

NETWORK MARKETING AND ANALYSIS TOOL

CROSS-REFERENCE TO RELATED APPLICATIONS

The present application claims priority under 35 U.S.C. §119 to U.S. provisional patent application 61/647,795, which was filed May 16, 2012, entitled "Network Marketing and Analysis Tool," and is hereby incorporated by reference in its entirety into the present application.

TECHNICAL FIELD

Aspects of the present disclosure generally relate to systems and methods that provide for a characterization of network traffic based on one or more IP-based attributes and more particularly for calculating payment settlements from telecommunication carriers and government entities based on the one or more IP-based attributes.

BACKGROUND

Telecommunication networks provide for the transmission of information across some distance through terrestrial, wireless, or satellite communication networks. Such communications may involve voice, data, or multimedia information, among others. Typically, a user or customer to a telecommunications network utilizes a communication device, such as a telephone or computer, to transmit and receive communications to and from another user of the telecommunications network. The network provides any number of components interconnected in such a manner as to facilitate the transmission of communications between two or more users of the network. The flow and handling of the various communications transmitted across the network is commonly known as traffic.

Generally, traffic is managed by one or more carriers and/or service providers, among other entities. Carriers are registered with and regulated by state and/or federal government entities, such as the Federal Communications Commission ("FCC"). In contrast, service providers utilize a carrier to provide information and communication products and services to users and as such, are not regulated by such government entities in the same manner.

Because no single major carrier controls the market, it is beneficial for the major carriers to interconnect with each other and/or service providers so that users perceive that they are interacting with a single, transparent network. As such, a particular carrier may exchange traffic with one or more other carriers and/or service providers to facilitate the transmission of communications between users. Depending on the nature of the traffic exchanged, a first carrier may receive payment settlements from a second carrier corresponding to the cost borne by the first carrier for carrying traffic originating from a user of the second carrier. Further, based on the information provided by the second carrier about the nature of a particular communication, such as a call, the first carrier may enable special capabilities or route the communication in a particular manner. However, it is often challenging to ascertain the nature of traffic exchanged or the nature of a particular communication with reasonable certainty, particularly in the context of payment settlements.

For example, the FCC redesigned the nation's intercarrier compensation framework, which dictates, in part, the payment settlements between carriers. In doing so, the FCC designated "VoIP-PSTN traffic," which is defined as traffic exchanged over Public Switched Telephone Network ("PSTN") facilities that originates and/or terminates in Internet Protocol ("IP") format, as being compensated differently than non-VoIP traffic. As such, within this compensation framework, carriers must differentiate VoIP-PSTN traffic originating and terminating on their networks for purposes of assessing access charges. The FCC directed carriers to differentiate VoIP-PSTN traffic using a jurisdictional factor, commonly known as a Percent VoIP Usage ("PVU"). Each carrier is required to calculate a PVU specific to its own traffic and provide that information to its switched access vendors. However, the introduction of PVU has caused confusion in the telecommunications industry as carriers attempt to evaluate the proper derivation and implementation of the PVU and to properly charge for VoIP-PSTN traffic. This confusion has resulted in numerous billing disputes between carriers.

It is with these observations in mind, among others, that various aspects of the present disclosure were conceived and developed.

SUMMARY

Implementations described and claimed herein address the foregoing problems, among others, by differentiating a portion of network traffic having an Internet Protocol-based attribute with reasonable certainty. In one implementation, data corresponding to a delivery of network traffic across a communications network is received. A portion of the network traffic includes the Internet Protocol-based attribute. A first filter is applied to obtain a first subset of the data based on one or more characteristics of originating access traffic. The first subset includes network traffic known to originate with the Internet Protocol-based attribute. A second filter is applied to data excluded from the first subset based on one or more characteristics of terminating access traffic to obtain a second subset of the data. The second subset includes network traffic known to terminate with the Internet Protocol-based attribute. The first subset is correlated with the second subset to identify the portion of network traffic having the Internet Protocol-based attribute.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve systems and methods for characterizing network traffic based on one or more Internet Protocol ("IP") based attributes. In one particular aspect, one or more filters are applied to network traffic to identify a portion of the network traffic having at least one specific IP-based attribute. The IP-based attribute may involve communications that originate and/or terminate in IP format, communications that employ an IP-based technology, or other traffic that utilizes IP as a transmission protocol.

In some aspects, the one or more filters include an originating filter and a terminating filter. The originating filter identifies communications as having the IP-based attribute based on characteristics of the network from which the communication originated, and the terminating filter identifies communications as having the IP-based attribute based on characteristics of the destination of the communication. For example, the origination filter may identify traffic that originates in IP format where the originating network has certified its traffic is IP-originated, and the termination filter may identify traffic that terminates in IP format where the communication is delivered to an IP destination. The traffic identified by the originating filter and the terminating filter is correlated to identify the portion of network traffic having the at least one specific IP-based attribute. The identification of the portion of network traffic having the specific IP-based attribute may be used to calculate payment settlements from entities such as telecommunication carriers or government entities, enable special capabilities, route a communication in a particular manner, or the like.

In one specific example, aspects of the presently disclosed technology may be implemented in the context of a Voice over Internet Protocol ("VoIP") network environment to differentiate traffic exchanged over Public Switched Telephone Network ("PSTN") facilities that originates and/or terminates in IP format. As such, in one particular aspect, a Percent VoIP Usage ("PVU") is calculated for the traffic of a carrier. The PVU may be used to properly charge the carrier's switched access vendors for VoIP-PSTN traffic. Pursuant to the standards set forth by the FCC, traffic is deemed VoIP-PSTN traffic if it is originated and/or terminated in IP format. To determine the PVU specific to each Operating Carrier Number ("OCN") and state from which a carrier purchases access services, traffic on a VoIP network is separated based on whether the traffic is certified as originating in IP format.

Traffic may be certified as originating in IP format, for example, where a carrier or service provider originating traffic to the VoIP network certifies traffic as IP originated. The originating and/or terminating format is not known for traffic for which no such certification exists. As such, the uncertified traffic is analyzed based on the originating network and the terminating network as well as the number of IP-enabled lines in the state in which the communication originated and the state in which the communication terminated. To account for any underrepresentation of the number of IP-enabled lines, think tank data, such as a percent of deployed IP-enabled Customer Premise Equipment ("CPE"), is utilized. Based on this information, a generalized percentage of VoIP-PSTN traffic is calculated, which estimates the portion of the uncertified traffic that is VoIP-PSTN, with reasonable certainty. The PVU of a specific OCN in a specific state may be determined based on the certified IP traffic and the generalized percentage of VoIP-PSTN traffic.

Figure 1:
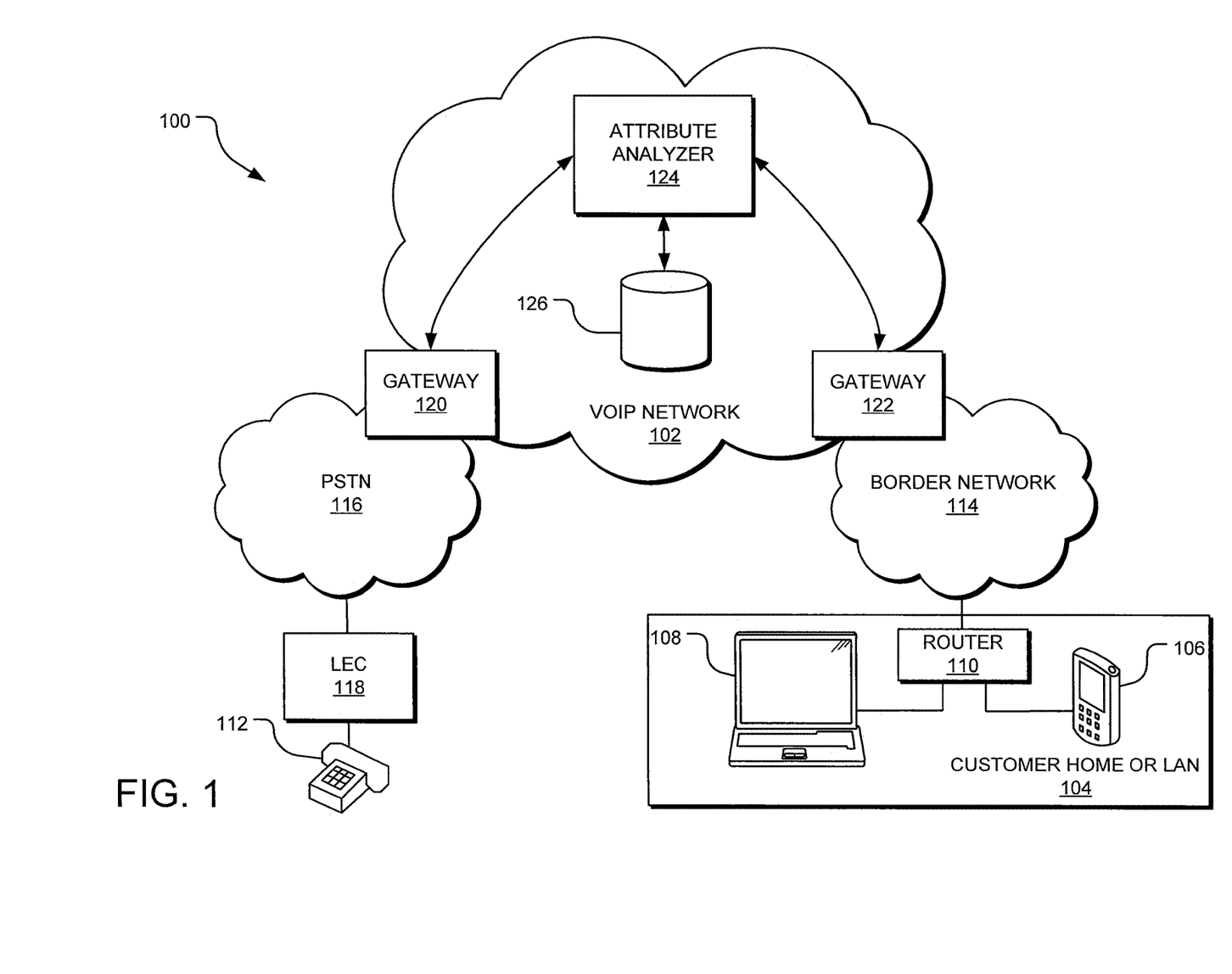
FIG. 1 is an example network environment incorporating an attribute analyzer for characterizing network traffic based on one or more IP-based attributes.

For a detailed description of an example network environment 100 for characterizing network traffic based on one or more IP-based attributes, reference is made to FIG. 1. In one implementation, one or more communication sessions may be set up between network users using various communication protocols. For example, the communication sessions may be VoIP communication sessions using an IP-based communication protocol. Communication via any of the networks in the network environment 100 may be wired, wireless, or any combination thereof.

As can be understood from FIG. 1, the network environment 100 includes a VoIP network 102, including numerous network components, such as gateway routers, servers, and registrars, which enable communication across the VoIP network 102 to one or more entities, such as customer home or business local area networks ("LAN") 104.

In one implementation, the customer network 104 includes communication devices, including, without limitation, a telephone 106 or a personal computer 108 connected to a router 110. The communication and networking components of the customer network 104 enable a user to communicate via the VoIP network 102 to other communication devices, such as another customer network and/or an analog telephone 112. Components of the customer network 104 are typically home or business based but may be relocated or portable. For example, the telephone 106 may be an IP-based wireless device, such as a mobile phone, Personal Digital Assistants (PDAs), tablets (e.g., iPad), or the like.

The customer network 106 typically connects to the VoIP network 102 via a border network 114, such as an Internet Service Provider ("ISP"). In some implementations, the border network 114 is provided and maintained by a business or organization, such as a local telephone or cable company. The border network 114 provides network, information, and/or communication related products and services to users. Generally, the border network 114 is a service provider that is not registered with or regulated by government entities, such as the state or the FCC, in the manner in which carriers are regulated.

The analog telephone 112 accesses, and is accessed by, the VoIP network 102 via a PSTN 116. In one implementation, the analog telephone 112 connects to the PSTN via a Local Exchange Carrier ("LEC") 118, which is a local telephone company. The LEC 118 may be, for example, a wireless carrier, a competitive LEC, a small rural incumbent LEC, or a large regional incumbent LEC. The LEC 118 and/or the VoIP network 102 are generally registered with and regulated by state government entities and federal government entities, such as the FCC.

The PSTN 116 and the border network 114 may communicate with the VoIP network 102 through a gateway 120 or 122, respectively, using different protocols. One or more trunks may connect the border network 114 to the VoIP network 102. In general, a trunk is a transmission channel between two points, typically between two networks. In an IP environment, the trunks provide the IP interconnect between the border network 114 and the VoIP network 102, such that an IP address is shared between the border network 114 and the VoIP network 102 to communicate between the network devices. Generally, IP-originating traffic is routed through separate trunks than non-IP-originating traffic.

In one implementation, as traffic passes through the gateways 120 and 122, an attribute analyzer 124 captures and/or analyzes one or more attributes of a communication. The attribute analyzer 124 differentiates traffic based on at least one IP-based attribute, such as communications: originating or terminating in an IP format; employing an IP-based technology; or utilizing IP as a transmission protocol. In one implementation, the attribute analyzer 124 analyzes the traffic to identify communications having the IP-based attribute. The attribute analyzer 124 may identify specific communications and/or determine a percentage of the total traffic managed by the VoIP network 102 having the IP-based attribute.

In identifying specific communications having the IP-based attribute, the attribute analyzer 124 may determine, for example, whether one or more of the communication devices 106, 108, and 112 are utilizing an IP-based technology in connection with a communication. The attribute analyzer 124 may characterize the communication based on the IP-based technology to enable special capabilities or enhanced functionality during the communication or route the communication in a particular manner. Similarly, when determining a percentage of the total traffic managed by the VoIP network 102 having the IP-based attribute, the type of traffic being exchanged between the networks may be identified. Further, the percentage of total traffic determined may be specific to each of the border network 114, the PSTN 118, the LEC 118, or another network or entity, as well as each state. Stated differently, in one implementation, the attribute analyzer 124 identifies a percentage of total traffic having at least one IP-based attribute specific to each OCN and state from which it purchases service. The identification of the portion of network traffic having the specific IP-based attribute may be used to calculate payment settlements from entities such as telecommunication carriers or government entities, enable special capabilities, route a communication in a particular manner, or the like.

In one implementation, the attribute analyzer 124 identifies a portion of network traffic having at least one specific IP-based attribute, with reasonable certainty, using one or more filters, which ensure that a communication is not counted more than once in identifying, for example, a percentage of network traffic having the IP-based attribute. The one or more filters may include an originating filter and a terminating filter. The originating filter identifies communications as having the IP-based attribute based on characteristics of the network from which the communication originated, and the terminating filter identifies communications as having the IP-based attribute based on characteristics of the destination of the communication.

Generally, the VoIP network 102 will include network components, such that each customer network of the VoIP network 102 (e.g., the border network 114 and the LEC 118) is tied to a particular network component. In one implementation, the VoIP network 102 includes a database 126 containing internal data specifying which network components service which customer. The internal data correlates the customer to particular characteristics, specifying if the customer network is known to originate traffic with specific IP-based attributes. In one implementation, the originating filter identifies traffic having a specific IP-based attribute using this internal data.

For example, as discussed herein, as traffic passes through the gateways 120 and 122, the attribute analyzer 124 captures and analyzes one or more attributes of a communication. In one implementation, information pertaining to the attributes is stored, for example, in a Call Detail Record ("CDR") in the database 126. The CDR includes data fields describing the attributes of the communication. For example, the CDR may specify a phone number of a user originating a call, the phone number receiving the call, the duration of the call, how the call was routed, etc. In one implementation, the CDR includes one or more data fields specifying whether the communication included any IP-based attributes. The attribute analyzer 124 may apply the originating filter to identify the portion of traffic that includes a specific IP-based attribute using internal data, such as the CDR. Stated differently, the attribute analyzer 124 applies the originating filter to identify the portion of traffic that includes a specific IP-based attribute based on characteristics of the network from which the communication originated.

In one implementation, traffic that is not identified in the application of the originating filter is further analyzed by the attribute analyzer 124 through the application of the terminating filter. As such, any traffic to which the terminating filter is applied cannot, with reasonable certainty, be identified as originating with the specific IP-based attribute. The attribute analyzer 124 applies the terminating filter to identify communications as having the specific IP-based attribute based on characteristics of the destination of the communication.

For example, in determine a percentage of traffic that terminates in an IP-format, the attribute analyzer 124 applies the terminating filter to identify communications terminating in known IP destinations. In other words, industry data stored in the database 126, such as routing information, may be used to determine the customer network through which the communication terminated, which may be correlated with internal data to determine if the customer network is assigned a block of numbers that terminate in IP-format. The industry data may include, for example, Local Exchange Routing Guide ("LERG") data, which among other functions, provides data to support routing of calls over the PSTN 116 and interconnection points of the PSTN 116 with IP-destinations. The attribute analyzer 124 correlates the customer network to particular characteristics, specifying if the customer network is known to terminate traffic with specific IP-based attributes. In one implementation, the terminating filter identifies traffic having a specific IP-based attribute using the industry and/or internal data. Stated differently, the attribute analyzer 124 applies the terminating filter to identify the portion of traffic that includes a specific IP-based attribute based on characteristics of the network at which the communication terminated.

Using the originating and terminating filters, the attribute analyzer 124 identifies the portion of traffic that utilizes a specific IP-based attribute in origination or termination. However, in some cases, the origination and/or termination attributes of a communication are unknown. For example, the originating and/or terminating format of some of the traffic may be unknown. Stated differently, in some circumstances, even though a customer network originating and/or terminating a communication may be a traditional, non-IP carrier, the traffic itself may be originated or terminated in IP format. As such, the attribute analyzer 124 undertakes additional analysis to estimate, with reasonable certainty, the percentage of traffic likely originating and/or terminating in IP format.

In one implementation, traffic that is not identified in the application of the originating filter and the terminating filter is further analyzed by the attribute analyzer 124 through the application of one or more secondary filters. As such, any traffic to which the one or more secondary filters are applied cannot, with reasonable certainty, be identified as originating or terminating with the specific IP-based attribute. In one implementation, the attribute analyzer 124 applies the secondary filters to identify communications as having the specific IP-based attribute based on government and/or think-tank data. Based on the application of the originating, terminating, and/or the secondary filters, the attribute analyzer 124 identifies specific communications and/or determines a percentage of the total traffic managed by the VoIP network 102 having the IP-based attribute.

For example, the attribute analyzer 124 may differentiate PSTN-VoIP traffic exchanged with a specific OCN in a specific state with reasonable certainty based on the originating filter, the terminating filter, and one or more secondary filters. In one implementation, the attribute analyzer 124 applies the secondary filters to identify the percentage of traffic likely originating and/or terminating in IP format based on an identification of the number of IP-enabled lines in in the state in which the communication originated and the state in which the communication terminated. The secondary filters may utilize government data that is aggregated at the state level, such as the FCC's Local Competition Report, to identify the number of IP-enabled lines. However, such government data often under-represents the number of IP-enabled lines in a state, particularly in the case of IP-enabled CPE being served by traditional non-VoIP lines.

As such, to account for any underrepresentation of the number of IP-enabled lines, the attribute analyzer 124 utilizes think-tank data, such as industry estimates of a percent of deployed IP-enabled CPE, in applying the secondary filters. Based on the application of the secondary filters, the attribute analyzer 124 determines a generalized percentage of VoIP-PSTN traffic. In one implementation, the attribute analyzer 124 determines the PVU of a specific OCN in a specific state based on the originating, terminating, and/or the secondary filters. The PVU is applied to the total intrastate access MOU exchanged with the OCN to determine the number of VoIP-PSTN traffic MOU. One specific example of the calculation and application of the PVU is described in detail with respect to FIG. 4.

Figure 2:
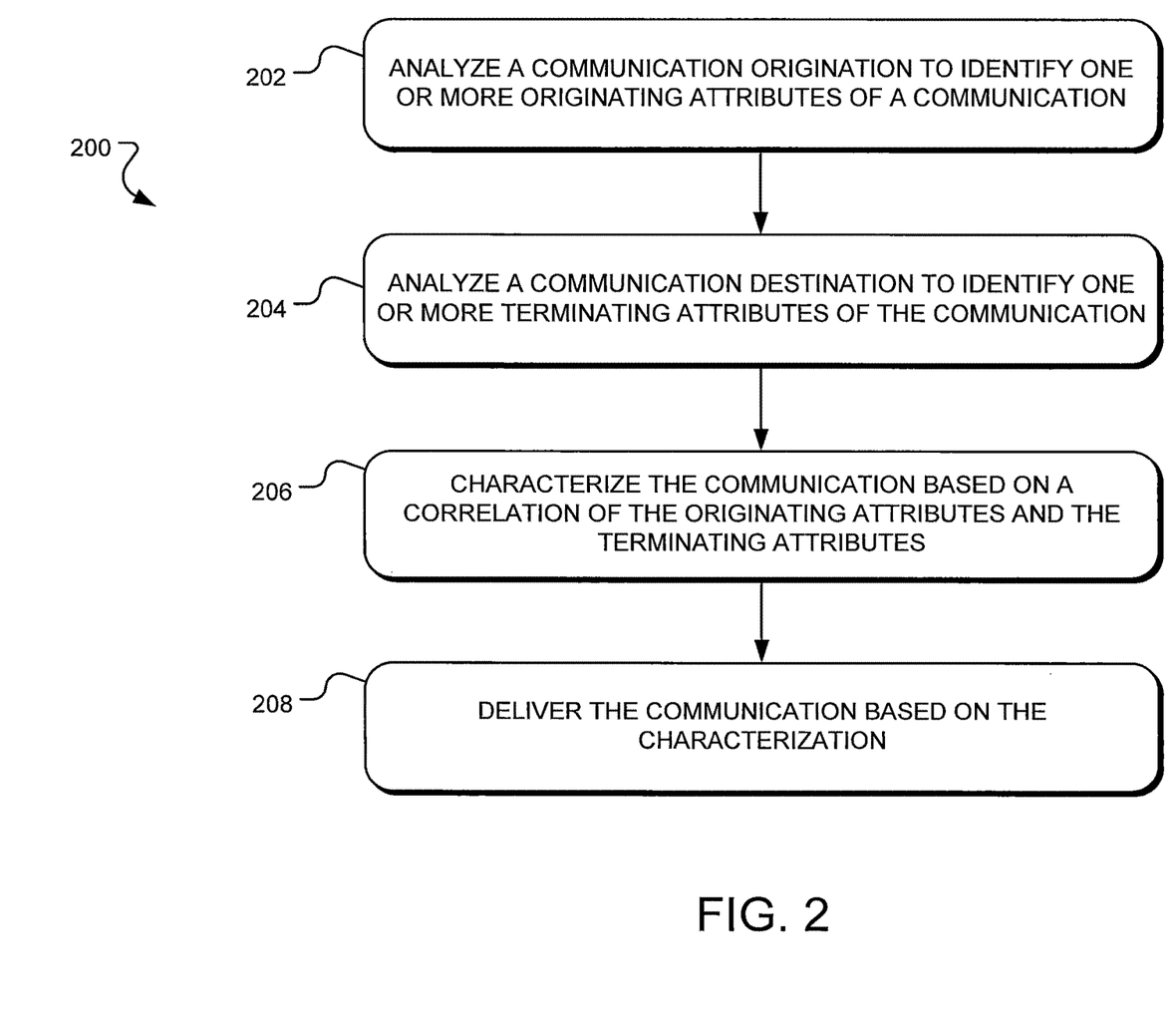
FIG. 2 illustrates example operations for delivering a communication based on one or more IP-based attributes.

Turning to FIG. 2, example operations 200 for delivering a communication based on one or more IP-based attributes are shown. In one implementation, a first analyzing operation 202 analyzes a communication origin to identify one or more origination attributes, including any IP-based attributes and non-IP-based attributes, of a communication.

In other words, the first analyzing operation 202 identifies any specific attributes present on an originating end of a communication. For example, the first analyzing operation 202 may identify and flag a communication originating with at least one IP-based attribute, which may include: IP-originating format; IP-based technology; IP-enhanced functionality or capabilities; or other IP-based transmission protocol attributes. In one implementation, the first analyzing operation 202 identifies the specific attributes present on the originating end of a communication based on characteristics of the network from which the communication originated. Stated differently, the first analyzing operation 202 determines whether the originating network is known to originate communications with the specific attributes. In one implementation, first analyzing operation 202 identifies the specific attributes using internal data, such as a CDR and customer data. The specific attributes flagged are identified by the first analyzing operation 202 as the origination attributes.

A second analyzing operation 204 analyzes a communication destination to identify one or more termination attributes, including any IP-based attributes and non-IP-based attributes, of the communication. In one implementation, the second analyzing operation 204 identifies any specific attributes present on a terminating end of a communication. For example, the second analyzing operation 204 may identify and flag a communication capable of terminating with at least one IP-based attribute, which may include: IP-terminating format; IP-based technology; IP-enhanced functionality or capabilities; or other IP-based transmission protocol attributes.

In one implementation, the second analyzing operation 204 identifies the specific attributes capable of being present on the terminating end of a communication based on characteristics of the network through which the communication will terminate. Stated differently, the second analyzing operation 204 determines whether the terminating network is known to terminate communications with the specific attributes. In one implementation, second analyzing operation 204 identifies the specific attributes using internal and/or industry data, such as a routing information and customer data. The specific attributes flagged are identified by the second analyzing operation 204 as the termination attributes. In some implementations, the second analyzing operation 204 is performed depending on the results of the first analyzing operation 202.

In one implementation, a characterizing operation 206 compares the originating attributes with the terminating attributes to identify any overlapping IP-based attributes. Stated differently, the characterizing operation 206 correlates the origination attributes and the termination attributes to determine whether at least one IP-based attribute is present or may be present at the originating end and terminating end of the communication. Based on the correlation of the origination attributes and the termination attributes, the characterizing operation 206 characterizes the communication. A delivering operation 208 delivers the communication based on the characterization.

As an example, the operations 200 may characterize a communication as having an IP-enhanced functionality or special capability and deliver the communication accordingly. Specifically, the first analyzing operation 202 may determine whether a communication originated with an IP-enhanced functionality among origination attributes of the communication. If the first analyzing operation 202 identifies the IP-enhanced functionality on the origin end of the communication, the second analyzing operations 204 determines whether the communication is capable of terminating with the IP-enhanced functionality, among the terminating attributes. The characterizing operation 206 correlates the origination attributes and the termination attributes to determine whether the IP-enhanced functionality is present in the origination attributes and the termination attributes. If the characterizing operation 206 determines that the IP-enhanced functionality is present in the origination attributes and the termination attributes, the characterizing operation 206 characterizes the communication as having the IP-enhanced functionality, and the delivering operation 208 delivers the communication with the IP-enhanced functionality.

Conversely, if the first analyzing operation 202 did not identify the IP-enhanced functionality on the origin end of the communication or the characterizing operation determines that the IP-enhanced functionality is not present in both the originating attributes and the terminating attributes, the characterizing operation 206 characterizes the communication as not having the IP-enhanced functionality, and the delivering operation 208 delivers the communication without the IP-enhanced functionality.

Figure 3:
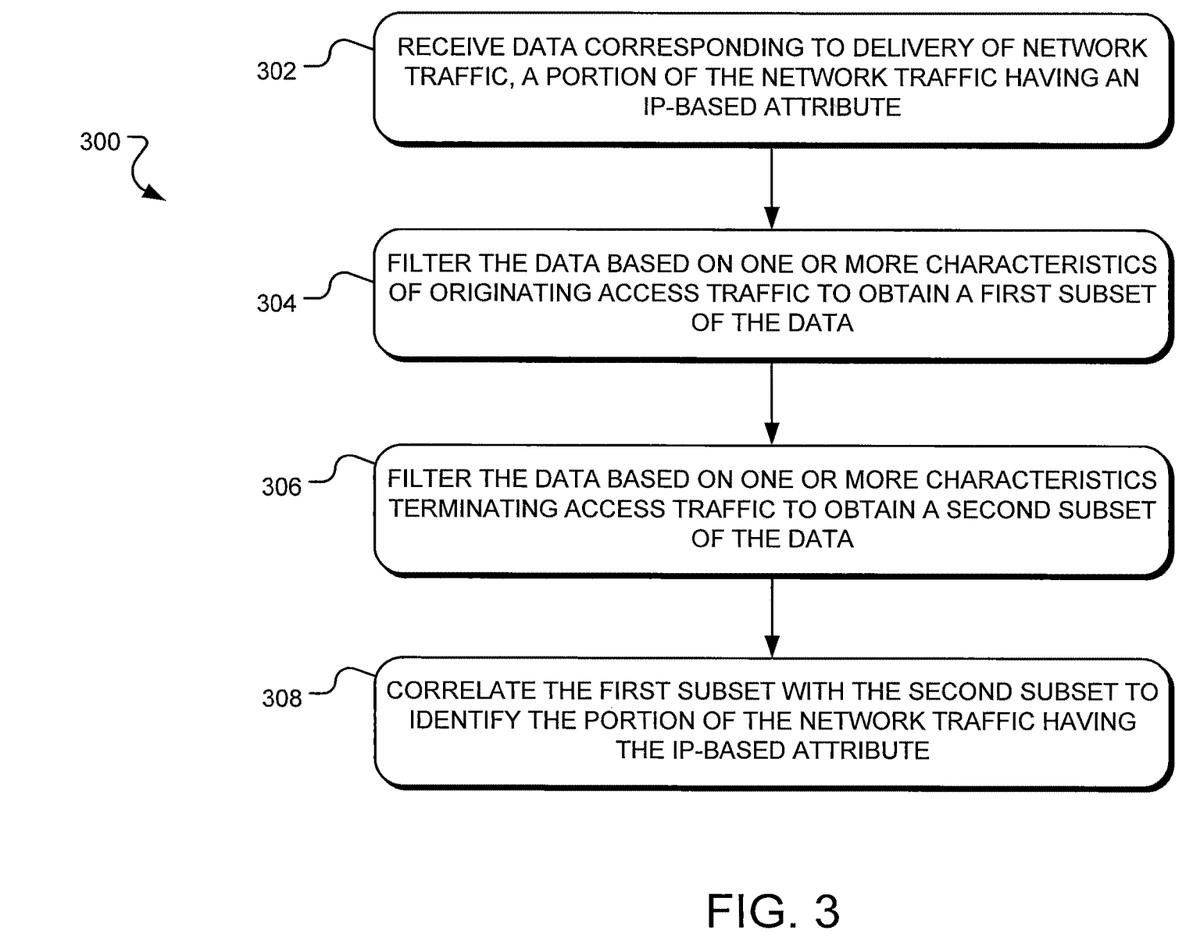
FIG. 3 shows example operations for identifying a portion of network traffic having an IP-based attribute.

For a detailed discussion of identifying a portion of network traffic having an IP-based attribute, reference is made to FIG. 3, which shows example operations 300. In one implementation, a receiving operation 302 receives data corresponding to delivery of network traffic across a communications network, such as a VoIP network. A portion of the network traffic includes an IP-based attribute.

To differentiate the traffic having the IP-based attribute, a first filtering operation 304 obtains a first subset of the data by filtering the data based on one or more characteristics of originating access traffic. In one implementation, the first filtering operation 304 analyzes data corresponding to the originating traffic accessing the communications network and correlates the data to internal data, such as a CDR and customer data, to identify traffic known to originate with the IP-based attribute.

To differentiate the traffic having the IP-based attribute that was not included in the first subset, a second filtering operation 306 obtains a second subset of the data by filtering the data based on one or more characteristics of terminating access traffic. In one implementation, the second filtering operation 306 analyzes data corresponding to the termination ends of the network traffic and correlates the data to internal data and/or industry data, such as customer data and routing information, to identify traffic known to terminate with the IP-based attribute. A correlating operation 308 correlates the first subset of data with the second subset of data to identify the portion of network traffic having the IP-based attribute.

Figure 4:
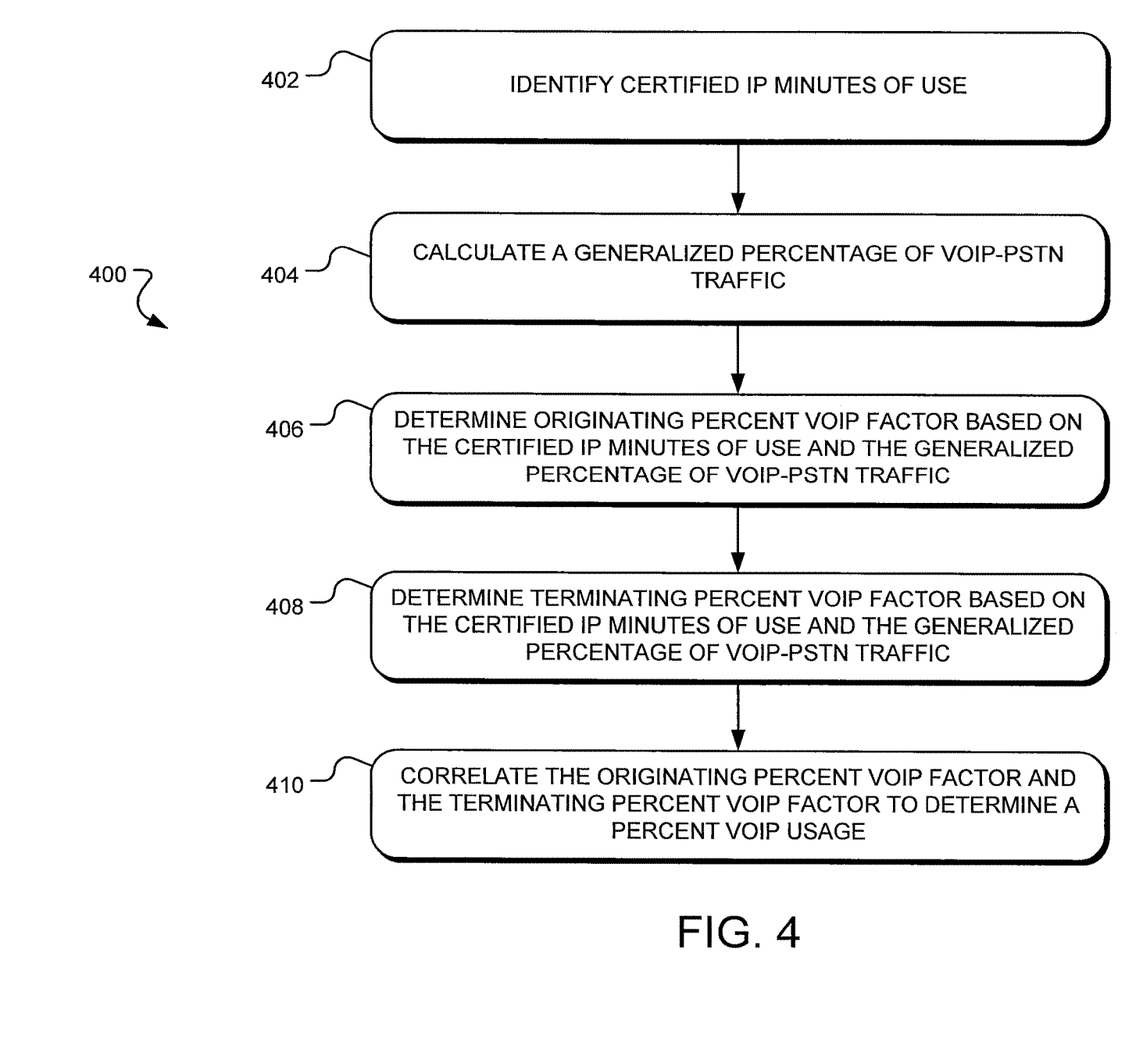
FIG. 4 illustrates example operations for determining a Percent VoIP Usage for a customer network of a VoIP network.

FIG. 4 illustrates example operations 400 for determining a PVU for a customer network of a VoIP network. In one implementation, an identifying operation 402 identifies certified IP MOU for a specific customer network in a specific state. The identifying operation 402 may identify certified IP MOU based on representations by the customer network, including that: all traffic delivered to the VoIP network for termination will be routed across separate trunk groups or IP addresses to terminate traffic that is and will at all times be IP-originated traffic; all traffic delivered to the VoIP network for termination over such separate trunk groups or IP addresses is and will at all times be IP-originated from the user's CPE; and/or all traffic deliver to the VoIP network that is not certified. IP-originated will use separate trunk groups or IP addresses for the delivery of such non-IP-originated traffic. In some implementations, the identifying operation 402 further identifies traffic involving in-bound toll-free services to users to whom the VoIP network delivers traffic in IP-format as certified IP MOU. One hundred percent of the certified IP MOU are counted towards the PVU.

A calculating operation 404 analyzes the remaining traffic for which the originating and/or terminating format is not known to calculate a generalized percentage of VoIP-PSTN traffic. In one implementation, the calculating operation 404 utilizes government data, including the FCC Local Competition Report, to determine the number of switched access (non-IP) lines and IP-enabled connections by state, market segment (residential and business), and LEC type. Using the Local Competition Report, the calculating operation 404 calculates an originating end government factor and a terminating end government factor. In one implementation, the calculating operation 404 determines the originating end government factor based on a ratio of FCC-reported total IP-enabled lines (residential and business) and the FCC-reported total lines, including IP-enabled and non-IP lines, for each state and LEC type. The calculating operation 404 determines the terminating end government factor similar to the originating end government factor, with the difference being that the terminating end government factor is calculated for only the portion of traffic that is not VoIP-PSTN on the originating end, thus preventing double counting of traffic.

The calculating operation 404 utilizes two-ended factors to account for traffic that is IP-based at both originating and terminating ends because a communication is classified as VoIP-PSTN if it originates or terminates in IP format. The calculating operation 404 calculates the two-ended factor based on a sum of the originating end government factor and the terminating end government factor.

Generally, relying on government data, such as the Local Competition Report, alone under-represents the amount of IP-enabled lines. As such, the calculating operation 404 adjusts the originating end government factor and the terminating end government factor based on industry, internal, and/or think-tank data. For example, the calculating operation 404 may calculate the adjustment to the originating end government factor based on the difference between the number of IP-based business lines, calculated using industry data (e.g., a Telecommunications Industry Association forecasted percent of connections to IP Private Branch Exchange (IP PBX) equipment) and the FCC total business lines, and the number of FCC-reported IP business lines. The calculating operation 404 may calculate the adjustment to the terminating end government factor similarly, again with the difference being that the terminating end government factor is calculated for only the portion of traffic that is not VoIP-PSTN on the originating end, thus preventing double counting of traffic.

In one implementation, the calculating operation 404 adds the originating adjustment factor to the originating end government factor to obtain an originating end generalized percentage IP factor, and the calculating operation 404 adds the terminating adjustment factor to the terminating end government factor to obtain an terminating end generalized percentage IP factor. The calculating operation 404 calculates the generalized percentage of VoIP-PSTN traffic based on the sum of the originating end generalized percentage IP factor and the terminating end generalized percentage IP factor.

A first determining operation 406 determines an originating percent VoIP factor based on the certified IP MOU and the generalized percentage of VoIP-PSTN traffic. Stated differently, the first determining operation 406 calculates the originating percent VoIP factor by combining the certified IP MOU and the non-IP certified traffic, for which the percentage IP is equal to the originating end generalized percentage of VoIP-PSTN traffic for the LEC type.

A second determining operation 408 determines terminating percent VoIP factor based on the certified IP MOU and the generalized percentage of VoIP-PSTN traffic. Stated differently, the second determining operation 408 calculates the terminating percent VoIP factor based on a weighted sum of the certified IP MOU and the remaining non-IP certified traffic, where the weighting is based on a mix of traffic at the originating end. A correlating operation 410 correlates the originating percent VoIP factor and the terminating percent VoIP factor to determine a PVU. As described herein, the PVU may be used to calculate payment settlements.

Figure 5:
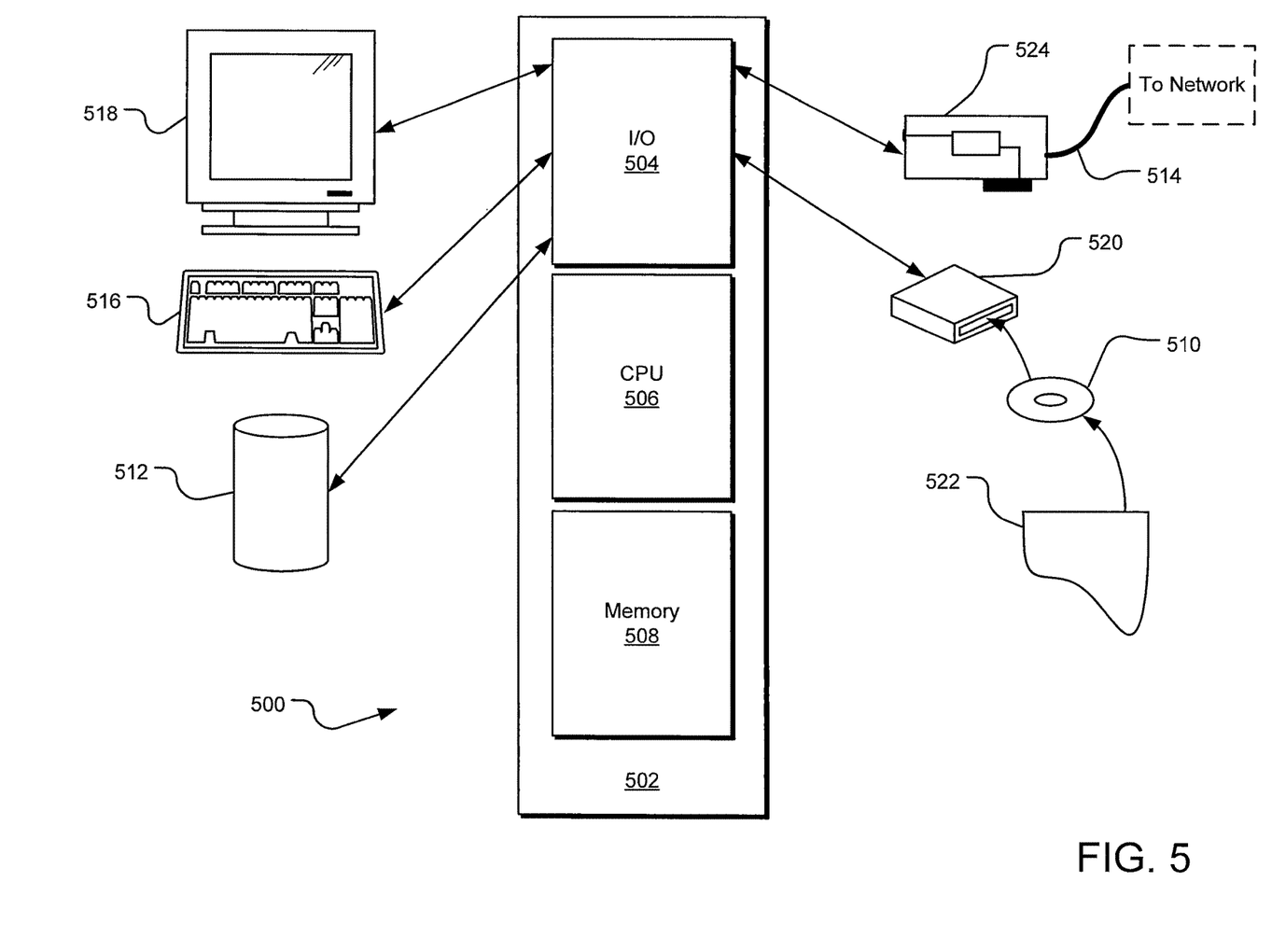
FIG. 5 is an example of a computing system that may implement various systems and methods discussed herein.

Referring to FIG. 5, an example computing system 500 that may implement various systems and methods discussed herein is shown. A general purpose computer system 500 is capable of executing a computer program product to execute a computer process. Data and program files may be input to the computer system 500, which reads the files and executes the programs therein. Some of the elements of a general purpose computer system 500 are shown in FIG. 5, wherein a processor 502 is shown having an input/output (I/O) section 504, a Central Processing Unit (CPU) 506, and a memory section 508. There may be one or more processors 502, such that the processor 502 of the computer system 500 comprises a single central-processing unit 506, or a plurality of processing units, commonly referred to as a parallel processing environment. The computer system 500 may be a conventional computer, a distributed computer, or any other type of computer, such as one or more external computers made available via a cloud computing architecture. The presently described technology is optionally implemented in software devices loaded in memory 508, stored on a configured DVD/CD-ROM 510 or storage unit 512, and/or communicated via a wired or wireless network link 514, thereby transforming the computer system 500 in FIG. 5 to a special purpose machine for implementing the described operations.

The I/O section 504 is connected to one or more user-interface devices (e.g., a keyboard 516 and a display unit 518), a disc storage unit 512, and a disc drive unit 520. Generally, the disc drive unit 520 is a DVD/CD-ROM drive unit capable of reading the DVD/CD-ROM medium 510, which typically contains programs and data 522. Computer program products containing mechanisms to effectuate the systems and methods in accordance with the presently described technology may reside in the memory section 504, on a disc storage unit 512, on the DVD/CD-ROM medium 510 of the computer system 500, or on external storage devices made available via a cloud computing architecture with such computer program products, including one or more database management products, web server products, application server products, and/or other additional software components. Alternatively, a disc drive unit 520 may be replaced or supplemented by a floppy drive unit, a tape drive unit, or other storage medium drive unit. The network adapter 524 is capable of connecting the computer system 500 to a network via the network link 514, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 500 is connected (by wired connection or wirelessly) to a local network through the network interface or adapter 524, which is one type of communications device. When used in a WAN-networking environment, the computer system 500 typically includes a modem, a network adapter, or any other type of communications device for establishing communications over the wide area network. In a networked environment, program modules depicted relative to the computer system 500 or portions thereof, may be stored in a remote memory storage device. It is appreciated that the network connections shown are examples of communications devices for and other means of establishing a communications link between the computers may be used.

In an example implementation, internal data, industry data, government data, think-tank data, a plurality of internal and external databases, such as the database 126, source databases, and/or cached data on servers are stored as the memory 508 or other storage systems, such as the disk storage unit 512 or the DVD/CD-ROM medium 510, and/or other external storage devices made available and accessible via a network architecture. Attribute analyzing software and other modules and services may be embodied by instructions stored on such storage systems and executed by the processor 502.

Some or all of the operations described herein may be performed by the processor 502. Further, local computing systems, remote data sources and/or services, and other associated logic represent firmware, hardware, and/or software configured to control operations of an attribute analyzer, communications device, and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 502 and a user may interact with a Graphical User Interface (GUI) using one or more user-interface devices (e.g., the keyboard 516, the display unit 518, and the communications devices 106, 108, and 112) with some of the data in use directly coming from online sources and data stores. The system set forth in FIG. 5 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
   identifying one or more origination attributes of a communication based on one or more characteristics of a network from which the communication originated;
   identifying one or more termination attributes of the communication based on one or more characteristics of a destination end of the communication, the termination attributes being identified when the one or more origination attributes include at least one Internet Protocol-based attribute;
   characterizing a type of the communication, using a processor, based on a correlation of the one or more origination attributes and the one or more termination attributes, the correlation determining whether the one or more origination attributes and the one or more termination attributes include the at least one Internet Protocol-based attribute; and
   delivering the communication to the destination end based on the at least one Internet Protocol-based attribute.

2. The method of claim 1, wherein the at least one Internet Protocol-based attribute is Internet Protocol-enhanced functionality.

3. The method of claim 1, wherein the communication is a call.

4. The method of claim 1, wherein the one or more characteristics of the network include a known origination of communications having a specific origination attribute.

5. The method of claim 1, wherein the one or more characteristics of the destination end include a known termination of communications having a specific termination attribute.

6. The method of claim 1, wherein the communication is delivered when the at least one Internet Protocol-based attribute is present in both the origination attributes and the termination attributes.

* * * * *